July 19, 1960 G. R. HOFFMANN 2,945,345
AIR FLOW CONTROL FOR JET PROPELLED CRAFT
Original Filed Aug. 2, 1951 3 Sheets-Sheet 1

INVENTOR.
George R. Hoffmann
BY
ATTORNEY.

July 19, 1960    G. R. HOFFMANN    2,945,345
AIR FLOW CONTROL FOR JET PROPELLED CRAFT
Original Filed Aug. 2, 1951    3 Sheets-Sheet 2

INVENTOR.
George R. Hoffmann
BY
ATTORNEY

# United States Patent Office 2,945,345
Patented July 19, 1960

2,945,345

AIR FLOW CONTROL FOR JET PROPELLED CRAFT

George R. Hoffmann, 8145 Craig, Overland Park, Kans.

Original application Aug. 2, 1951, Ser. No. 239,875. Divided and this application July 3, 1957, Ser. No. 669,774

3 Claims. (Cl. 60—35.6)

This invention relates to heavier than air equipment such as airplanes, missiles and the like, and more particularly to a thrust or jet propelled engine, the primary object being to provide in combination certain novel features capable of reducing hazard, economizing on fuel consumption, and regulating the capacity thereof to suit the desires and needs of the user.

This application is a division of my application, Serial No. 239,875, filed August 2, 1951, and now U.S. Patent 2,806,350.

It is the most important object of the present invention to provide a thrust engine that includes a pair of telescoped tubes, both of which are provided with a fairing to present the proper streamlining and each being provided with a separate air control, combustion chamber, fuel injection system, means to ignite the combustible mixture, and structure for eliminating the formation of ice at the air inlet of the tubes.

Another object of the present invention is the provision of a thrust engine wherein the air inlets of at least one of the aforesaid tubes is provided with a plurality of vanes, movable toward and from a fully closed position whereby to control the air flow therethrough.

Another important object hereof is to provide a fuel injection system for thrust engines of the aforesaid character that includes means for pressurizing the raw liquid fuel prior to injection thereof into the combustion chambers whereby a completely vaporized admixture is presented to the engine and particularly to the air flow therethrough.

A further object hereof is to provide de-icing means as above indicated and including a conductor in the form of a split ring that becomes energized immediately upon bridging of the ends thereof by water and/or ice.

Another object hereof is to provide a fuel diffuser in one of the aforesaid tubes within the path of travel of the fuel injected thereinto and within the air stream through the tube for rotation thereby.

A further object of this invention is to provide air pressurizing means adapted for secondary use as a fuel diffuser as aforesaid, including a rotatable driven wheel-like device having a plurality of vanes that may be tipped to control the extent of pressurizing and the air flow through the inner tube.

Other objects include details of construction all of which will be made clear or become apparent as the following specification progresses, reference being had to the accompanying drawing, wherein:

Fig. 5 is an elevational view, parts being broken away to reveal the manner of assembling the engine into a missile or the like.

Figure 1:
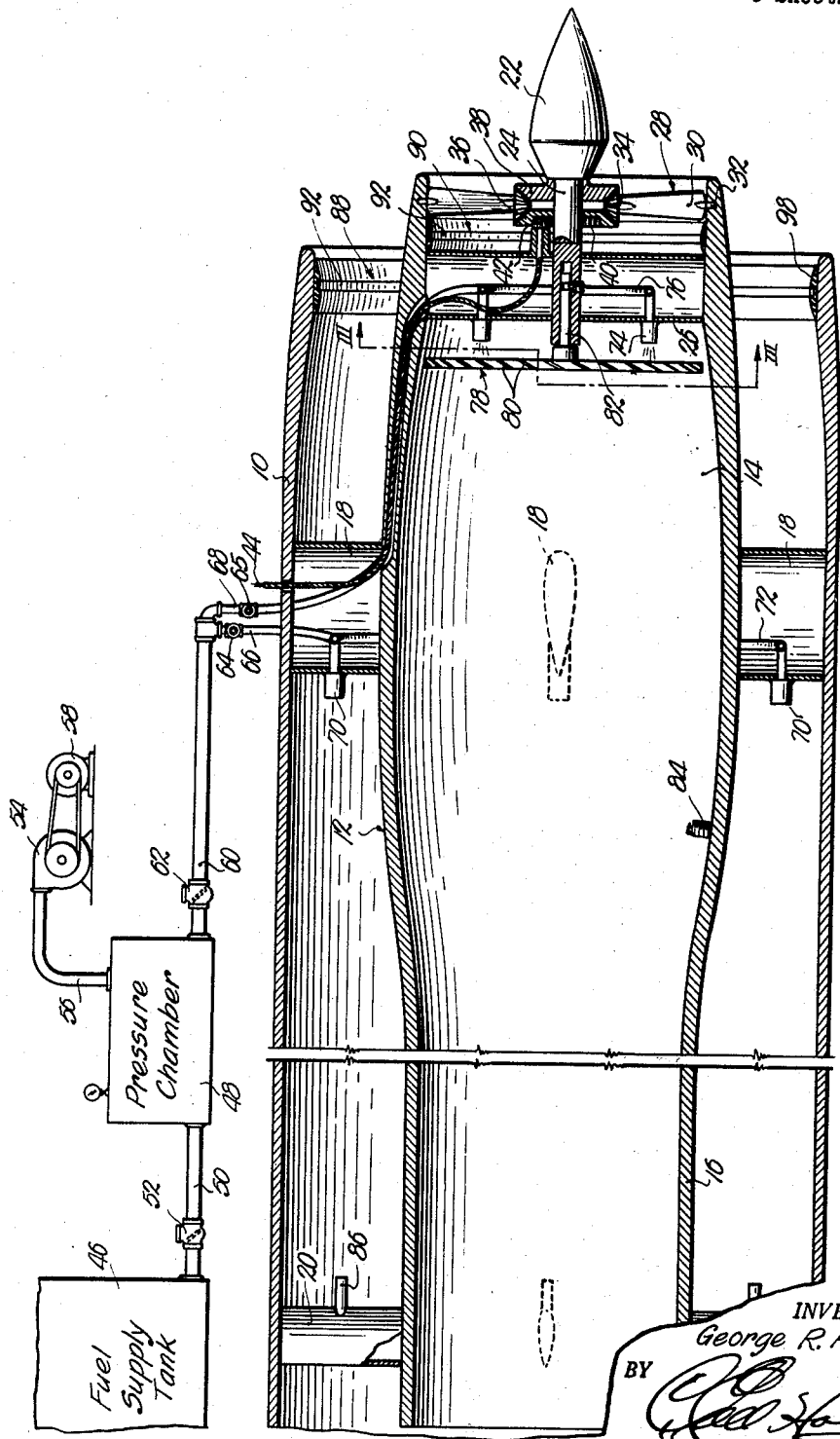
Figure 1 is a fragmentary, vertical, cross-sectional view, partially schematic, showing a thrust engine made according to the present invention.
Figure 2:
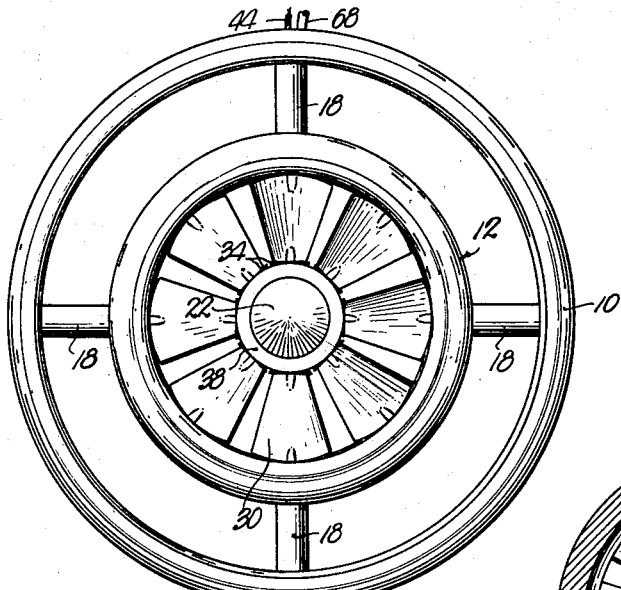
Fig. 2 is a front end elevational view thereof.
Figure 3:
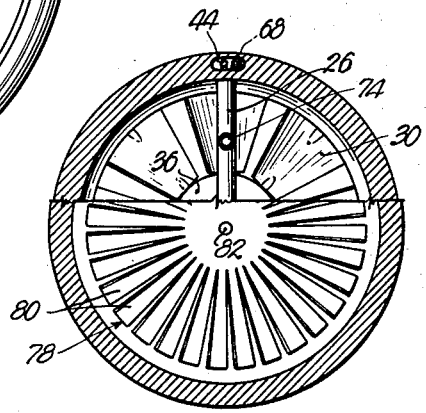
Fig. 3 is a cross-sectional view taken on irregular line III—III of Fig. 1.

In Fig. 1 of the drawing there is illustrated a thrust engine of the jet propelled type that includes an elongated, outermost tube 10 that is substantially cylindrical throughout the length thereof, and an inner tube 12 of appreciably smaller diameter and having an enlarged combustion chamber 14, together with an elongated, cylindrical tail pipe 16 integral therewith.

The tubes 10 and 12 are preferably in coaxial relationship and interconnected through the medium of suitable supporting struts 18 and 20, both of which are preferably tubular and streamlined as indicated by dotted lines in cross-section by Fig. 1. An entrance-head 22 extends outwardly from the longitudinal axis of the tube 12 and is mounted on an inwardly extending shaft 24 that is in turn held in place by suitable struts 26 within the tube 12.

The shaft 24 is additionally adapted to receive a shutter assembly broadly designated by the numeral 28 and including a plurality of vanes 30 extending radially relative to the shaft 24 and adapted to completely close the forwardmost end of the tube 12 when in the closed condition. Each vane 30 is provided with a pintle 32 pivotally carried by the tube 12 adjacent the inlet end thereof and an opposed bevel pinion 34. All of the pinions 34 are in mesh with a pair of opposed bevel gears 36 and 38, carried by the shaft 24. Rotation of the gear 36 on the shaft 24 controls the swinging movement of vanes 30 on their pintles 32 and gear 38 freely rotatable on the shaft 24 serves as an idling stabilizer. An internal, annular gear 40 on the gear 36 receives a small pinion 42 that is in turn connected with a flexible cable 44 extending upwardly through the walls of tube 12 and terminating exteriorly of the tube 10.

Fuel is supplied to the interiors of tubes 10 and 12 from a liquid fuel supply tank 46 that is in turn connected with a second tank forming a pressure chamber 48 by means of a line 50 having a check valve 52 therein. A suitable compressor 54 connected with the chamber 48 by a pipe 56 is driven by a suitable prime mover such as an electric motor 58. An outlet line 60 for the pressure chamber 48 has a check valve 62 therein. Line 60 is in turn connected with a pair of conduits 66 and 68 for tubes 10 and 12 respectively, and in turn provided with control valves 64 and 65 respectively.

The struts 18 carry a plurality of injection nozzles 70 directed toward the outlet end of the tube 10 and connected with the conduit 60 by a manifold 72 surrounding the tube 12. Likewise, the struts 26 have a plurality of fuel injection nozzles 74 directed into the combustion chamber 14 and connected with the conduit 68 by means of an annular manifold 76 surrounding the shaft 24.

A diffuser 78 for the fuel emanating from nozzles 74 comprises an annular disc having a plurality of inclined, radial vanes 80 adapting the same for free rotation in response to the air flow through the tube 12. The diffuser 78 is provided with a stub shaft 82 freely rotatable within the innermost end of the shaft 24.

Fuel ignition means such as one or more spark plugs 84, is provided within the combustion chamber 14 of the pulse jet tube 12. Similarly, ignition means such as flares 86 may be provided within the ram jet tube 10 on the strut 20 if desired.

Figure 4:
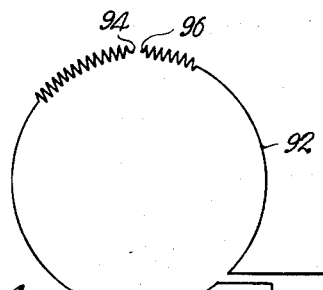
Fig. 4 is a schematic wiring diagram of one of the de-icing assemblies.

Tubes 10 and 12 are provided with identical de-icing assemblies 88 and 90 respectively at the air inlet ends thereof each of which comprises an annular strip 92 of conducting material provided with spaced-apart ends 94 and 96 in the manner illustrated in Fig. 4 of the drawings. Each annular strip is mounted within suitable insulating blocks 98 and each is connected with a source of electrical energy such as a battery 100 (Fig. 4).

Figure 5:
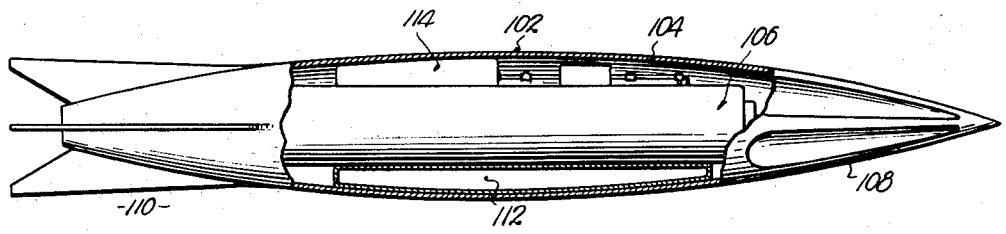

When the thrust engine is used as a power means for a missile or rocket 102, as shown in Fig. 5 of the drawings, it is preferably housed within a streamlined body 104, the entire engine being designated in Fig. 5 of the drawings by the numeral 106. A war head 108 may be included as a part of the body 104 at one end of the latter and a tail assembly such as at 110 may be provided at the opposite end of the body 104. The spacing between the engine 106 and the inner walls of the body 104 may be utilized to receive a fuel tank 112 and other necessary equipment such as radial controls, fuel pressurizing means and the like, all broadly designated by the numeral 114.

In operation, fuel is pressurized within the chamber 48 by means of compressor 54 prior to passage thereof to nozzles 70 and 74 as the case may be. Control of the flow of pressurized fuel is obtained by suitable connection within the cockpit (not shown) with the control valves 64 and 65. The fuel emanating from nozzle 74 is additionally vaporized by the whirling diffuser 78 actuated by the air-stream through the pulse jet tube 12. The mixture is thereupon ignited by the spark plugs 84 within the combustion chamber 14.

Similarly, the fuel emanating from the nozzles 70 is directed into the air-stream within tube 10 and surrounding tube 12 and the admixture is ignited by the ignition flares 86.

By means of the control cable 44 also leading to the cockpit, the vanes 28 may be opened or closed and held in any predetermined position as desired.

In the event moisture forms on the strips 92 of diffusers 88 and 90, corresponding electrical circuits will immediately be closed and the heat from the strips will prevent formation of ice. In this respect it is seen that the two de-icers operate immediately to prevent collection of ice and therefore, reduce this hazard to a point where flow of air through the pipes is at no time decreased by such ice collection.

It is apparent further that the shutter assembly 28 may be duplicated around the tube 12 and within tube 10 and further, that such shutter assemblies may be rendered fully automatic in response to the velocity of air-flow through the tubes and/or under direct control of the pilot through flexible cables or the like as illustrated at 44. Since the fuel injection means is separately controlled and such shutter means likewise operated selectively by the pilot, either or both of the tubes may be placed in use.

Figure 7:
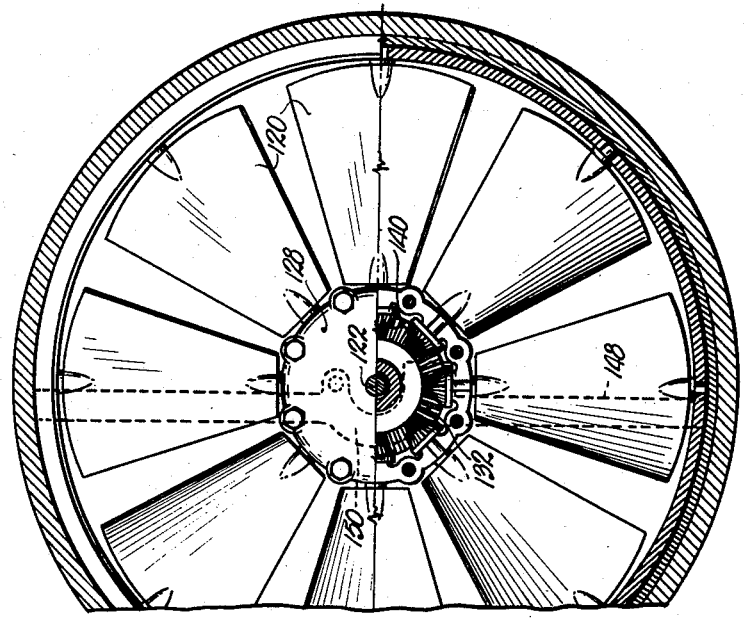
Fig. 7 is a fragmentary, transverse, cross-sectional view taken on irregular line VII—VII of Fig. 6.
Figure 6:
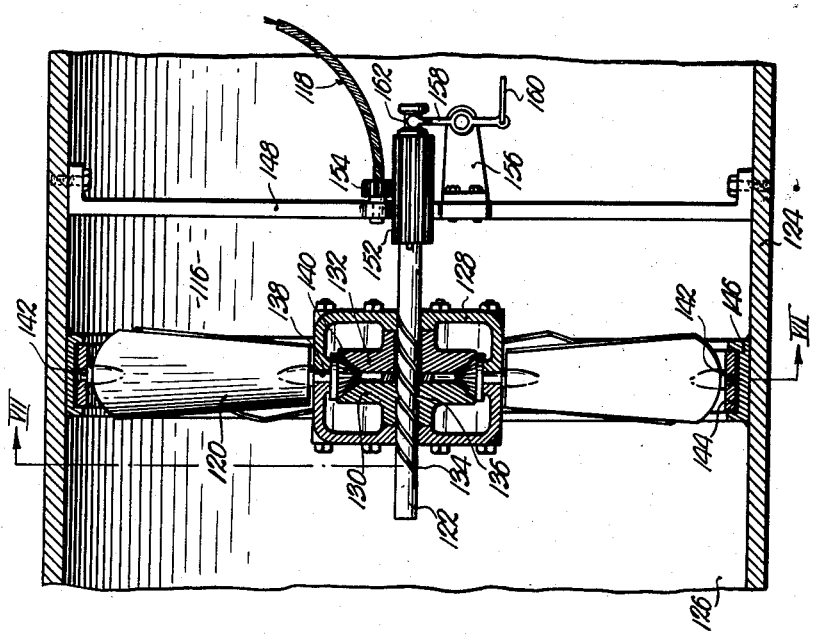
Fig. 6 is a vertical, cross-sectional view through the inner tube illustrating a modified form of diffuser adapted to pressurize air within the combustion chamber of the inner tube.

In Figs. 6 and 7 of the drawings, there is illustrated a modified diffuser broadly designated by the numeral 116 that differs from the diffuser 78 in that the same is driven from an auxiliary source of power not shown through a flexible cable 118 and is provided with a plurality of blades 120 that are tiltable on their longitudinal axes. As in the case of diffuser 78, a plurality of wheel-like structures 116 may be provided if desired and while not shown in Figs. 6 and 7 of the drawings, nozzle 74 may be disposed to direct fuel into the combination diffuser and pressurizing structure 116.

An elongated shaft 122 is disposed on the longitudinal axis of an inner tube 124 and extending inwardly into combustion chamber 126 of tube 124. A gear box 128 surrounding the shaft 122 has a pair of gears 130 and 132 thereon, gear 132 constituting a mere idler and shaft 122 being freely reciprocable and rotatable within the gear 132.

Spiral groove 134 within the shaft 122 receives an ear 136 forming a part of the gear 130. Each of the plurality of vanes 120 is provided with a pin 138 at the innermost end thereof for receiving a conical pinion 140 disposed between the gears 130 and 132 in mesh therewith. Additionally, each vane 120 has a pintle 142 at the outermost end thereof freely rotatable within an annular rim 144 in turn rotatable within a U-shaped track 146 on the inner face of the tube 124.

A strut 148 within tube 124 has a semi-circular central portion 150 that partially surrounds the shaft 122 and particularly an elongated gear 152 thereon. Cable 118 joins with a small gear 154 mounted on the strut 148 and in mesh with the gear 152. A bracket 156 on the strut 148 pivotally receives a yoke 158 having an actuating rod 160 pivotally secured thereto. The yoke 158 embraces the shaft 122 within an annular groove 162 formed therein.

The assembly 116 is rotated from the flexible cable 118 through gear 154, gears 152, shaft 122, ear 136, gear 130, pinions 140 and vanes 120 to rim 144. In the event the pitch of the vanes 120 is to be varied, either while the assembly 116 is rotating or in a stand-still condition, the shaft 122 is reciprocated on its longitudinal axis by actuation of rod 160. Yoke 158 is thereby swung on the bracket 156 and shaft 122, as well as the gear 152, are shifted rectilinearly with respect to the gear 154. Such movement of the shaft 152 rotates the gear 130 through the ear 136, thereby rotating all of the pinions 140 simultaneously and turning the vanes 120 on their pintles 142.

It is obvious that if additional support is desired for the shaft 122, struts similar to strut 148 and including bearings for the shaft 122, may be provided on each side of the gear housing 128. Furthermore, cantilever support may be provided for the vanes 120 thereby eliminating the rim 144, pintles 142 and the track 146. It is clear that by driving the assembly 116 faster than would be possible through flow of air alone as in the case of diffuser 78, the combustion chamber 126 is pressurized to such degree as may be desired through adjustment of the vanes 120. Such pressurizing of the combustion chamber increases the over-all efficiency of the engine and not only aids in supporting combustion, but provides a propulsion force that is considerably greater than made possible by reliance solely on the force of air through the inner tube as above described in connection with the diffuser 78.

It is additionally noteworthy that while the impeller or supercharger 116 hereof is shown for use in connection with a thrust engine, it is applicable for use in connection with various other types of air craft or prime movers generally where diffusing of fuel and/or pressurizing of combustion chambers or the like is desired.

Having thus described the invention what is claimed as new and desired to be secured by Letters Patent is:

1. Jet propulsion apparatus comprising an elongated, cylindrical inner tube; an elongated, cylindrical outer tube of substantially equal diameter throughout the length thereof and surrounding said inner tube in spaced, coaxial relationship thereto, said outer tube being of streamlined configuration, said tubes being of substantially equal length and having proximally disposed, circular margins at corresponding ends thereof defining respective air intakes, a rear portion of the inner tube having a smaller diameter than the forward portion thereof to present a cylindrical region of greater transverse cross-sectional area in surrounding relationship to said rear portion of the inner tube between the latter and the opposed inner surface of the outer tube, than the cross-sectional area of the annular region defined between said forward portion of the inner tube and the opposed inner surface of the outer tube, said front portion of the inner tube merging smoothly with said rear portion thereof; adjustable air control means within the air intake of said inner tube for selectively varying the amount of air permitted to pass thereinto during forward movement of said apparatus; fuel and air diffuser means mounted within said forward portion of the inner tube transversely thereof and in relatively close proximity to said air intake of the same; a plurality of fuel injectors mounted within the inner tube circumferentially thereof between said air control means and the diffuser, and disposed to direct individual jets of fuel under pressure directly against said diffuser means to thereby aspirate the same from said intake opening thereof to form a combustible mixture within a zone of said forward portion of the inner tube rearwardly of said diffuser means; ignition means mounted on the inner tube within said zone thereof and disposed in relatively close proximity to said diffuser means for igniting the combustible mixture within said zone; a plurality of fuel injectors within the part of said outer tube surrounding said forward portion of the inner tube, disposed circumferentially around the inner tube and discharging rearwardly of the outer tube to aspirate air passing into the space between the inner and outer tubes to form a combustible mixture; and ignition means within the outer tube adjacent the outlet end of the inner tube for igniting the combustible mixture in said outer tube.

2. Jet propulsion apparatus as set forth in claim 1 wherein said air control means within the air intake of said inner tube comprises a shaft mounted coaxial with said inner tube, a plurality of variable pitch shutter blades secured to said shaft in radially extending relationship thereto, each of said shutter blades being rotatable about the longitudinal axis thereof, gear means operably coupled with said shutter blades for varying the pitch thereof to and from closed positions, and actuating means connected to said gear means for permitting change in pitch of the shutter blades from a point remote from said outer tube.

3. Jet propulsion apparatus as set forth in claim 2 wherein said diffuser means comprises a disc rotatably mounted on said shaft in coaxial relationship thereto, said disc having a plurality of inclined radial vanes of fixed pitch presenting slots of progressively increasing width as the outer ends of corresponding vanes are approached and defining a turbine rotatable about said shaft under the influence of air and fuel therethrough, prior to ignition of said combustible mixture.

References Cited in the file of this patent

UNITED STATES PATENTS

| | | |
|---|---|---|
| 2,474,068 | Sammons et al. | June 21, 1949 |
| 2,508,288 | Owner et al. | May 16, 1950 |
| 2,595,505 | Bachle | May 6, 1952 |
| 2,602,292 | Buckland et al. | July 8, 1952 |
| 2,610,465 | Imbert et al. | Sept. 16, 1952 |
| 2,742,761 | Mullen | Apr. 24, 1956 |
| 2,773,350 | Barrett et al. | Dec. 11, 1956 |

FOREIGN PATENTS

| | | |
|---|---|---|
| 627,885 | Great Britain | Aug. 17, 1949 |